United States Patent [19]
Leslie et al.

[11] 3,726,927
[45] Apr. 10, 1973

[54] AROMATIC SULPHONES

[75] Inventors: Victor Jeffrey Leslie, Potters Bar; John Brewster Rose, Letchworth, both of England

[73] Assignee: Imperial Chemical Industries, Limited, London, Great Britain

[22] Filed: July 20, 1970

[21] Appl. No.: 56,709

[30] Foreign Application Priority Data

| June 19, 1970 | Great Britain | 29,910/70 |
| June 3, 1970 | Great Britain | 26,834/70 |
| Feb. 31, 1969 | Great Britain | 38,437/69 |

[52] U.S. Cl. ...................... 260/607 A, 260/79.3 A
[51] Int. Cl. ........................................ C07c 147/06
[58] Field of Search .......................... 260/607 A

[56] References Cited

UNITED STATES PATENTS 2,998,454  8/1961  Nichols ....................... 260/607 A

OTHER PUBLICATIONS

Pavlath et al. "Aromatic Fluorine Compounds" (1962)

Primary Examiner—Lewis Gotts
Assistant Examiner—D. R. Phillips
Attorney—Cushman, Darby & Cushman

[57] ABSTRACT

A 4-(4-halophenylsulphonyl)biphenyl (halogen being Cl or F) is a valuable intermediate for preparing aromatic sulphones which are useful as starting materials for polymerization reactions to give polysulphones containing biphenyl residues in the polymer chain.

1 Claim, No Drawings

AROMATIC SULPHONES

The present invention relates to aromatic sulphones.

The present invention provides new aromatic sulphones of formula (I)

in which X is a chlorine or fluorine atom.

The compounds are valuable intermediates for preparing aromatic sulphones which are useful as starting materials for polymerization reactions to give polysulphones containing biphenyl residues in the polymer chain.

According to the present invention therefore there are provided new aromatic sulphones of the formula (I) as above defined.

The sulphones may be prepared in a manner well known for the production of aromatic sulphones. According to a feature of the invention they are prepared by reacting a compound of formula $A - SO_2 - Y$ where Y is a halogen atom, preferably chlorine, or a hydroxy group, with a compound of the formula $H - B$ under conditions in which YH is eliminated, to form a compound $A - SO_2 - B$ where A and B are different and selected from

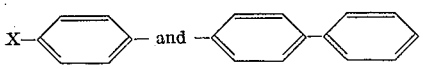

groups.

The compound (I) in which X is chlorine may conveniently be prepared by a Friedel-Craft's reaction starting from biphenyl which is reacted in nitrobenzene as solvent with 4-chlorobenzenesulphonyl chloride in the presence of anhydrous ferric chloride as catalyst. The compound in which X is fluorine can also be prepared in an analogous manner from 4-fluorobenzenesulphonyl chloride. In place of ferric chloride other catalyst which are well known to promote this type of reaction may be used, for example aluminum chloride, boron trifluoride, antimony pentachloride, indium trichloride and other ferric salts, for instance ferric acetoacetonate, ferric orthophosphate and ferric fluoride.

The compounds of formula (I) may also be prepared by any other method known for analogous compounds e.g. in a manner analogous to that described in U.S. Pat. No. 3,125,604 or British specification 895,464. For example, they may be prepared from 4-chlorobenzene sulphonic acid or 4-fluorobenzene sulphonic acid which is reacted with biphenyl in the presence of a pentavalent phosphorus halide such as phosphorus pentachloride, pentabromide, oxychloride or oxybromide which acts as a condensing agent; in this reaction minor amounts of 4-halobenzenesulphonyl halide produced may be converted to compound (I) by the addition of a Friedel-Craft's catalyst to cause it to react with biphenyl. An alternative process comprises reacting biphenyl with the appropriate halobenzenesulphonic acid in the presence of methyl pyrosulphate according to the method described in British Patent Specification No 895,464, the contents of which are herein incorporated by reference.

4-(4-Fluorophenylsulphonyl)biphenyl may also be prepared from the corresponding 4-chloro-compound by reacting the latter with an alkali metal fluoride such as potassium fluoride, to replace the chlorine atom with a fluorine atom.

According to the present invention therefore there is provided, as a valuable intermediate for the preparation of polysulphones, a 4-(4-halophenylsulphonyl)biphenyl of formula (I) as defined.

The invention also comprises the methods referred to above for the preparation of the compounds of formula (I).

EXAMPLE 1

A mixture of biphenyl (308 g; 2.0 mole) and 4-chlorobenzenesulphonyl chloride (422 g; 2.0 mole) was dissolved in redistilled nitrobenzene (500 cm³) and the solution was stirred under an atmosphere of nitrogen and heated to 110°C. Anhydrous ferric chloride (4 g) was added and stirring was continued, while the mixture was kept at 110°C, until the evolution of hydrogen chloride subsided.

The dark-colored solution was then poured into methanol (2 liters) and the precipitate was filtered off, washed twice with a solution of acetylacetone (5 cm³) in methanol (500 cm³), and after a final wash with methanol was air-dried. The yield was 524 g (80 percent) of a product of m.p. 167°–168°C. recrystallization from acetic acid (with charcoal) gave pure white needles of 4-(4-chlorophenylsulphonyl)biphenyl, m.p. 171°–173°C. The elemental analysis, and the infra-red and nuclear magnetic resonance spectra of this product were consistent with this structure

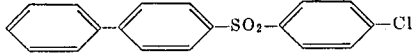

A starting material for a polymerization reaction was made from this product, and subsequently polymerized as follows.

A mixture of 4-chlorophenylsulphonylbiphenyl (164.2g; 0.5 mole) and redistilled 4-fluorobenzenesulphonyl chloride (b.p. 88°C at 2.5 torr) (105 g; 0.54 mole) was dissolved in nitrobenzene (350 cm³) and the solution was warmed to 110°C. Anhydrous ferric chloride (2 g) was added and stirring was continued at 110°C until hydrogen chloride ceased to be evolved. The dark-colored viscous mass was poured into methanol (1 liter) and the precipitate was filtered off. It was washed with a solution of acetylacetone (3 cm³) in methanol (300 cm³) and then with methanol (300 cm³), and was then dried. Recrystallization from acetic acid (with charcoal) afforded long colorless needles of 4-(4-chlorophenylsulphonyl)-4'-(4-fluorophenylsulphonyl)biphenyl. The yield was 162.5 g (68 percent) of a product of m.p. 237°–238°C. The infra-red and nuclear magnetic resonance spectra and the elemental analysis of this product were consistent with the structure

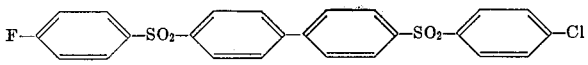

4-(4-Chlorophenylsulphonyl)-4'-(4-fluorophenylsulphonyl)biphenyl (48.65 g; 0.1 mole) was dissolved in dimethyl sulphoxide (510 cm³) by heating the stirred mixture to 110°C in a stainless steel vessel and under a nitrogen atmosphere. To this was added a solution of potassium hydroxide in water (223.22 g of solution; 0.2 mole KOH), and the mixture was vigorously stirred.

The temperature of the mixture was gradually raised over 5.5 hours to 125°C The cooled mixture was poured into dilute hydrochloric acid (2 liters), and the white precipitate was filtered off and washed several times with water. The material was recrystallized from acetic acid to give colorless needles of 4-(4-chlorophenylsulphonyl)-4'-(4-hydroxyphenylsulphonyl)biphenyl, m.p. 235°–238°C. The infra-red and nuclear magnetic resonance spectra were consistent with the structure

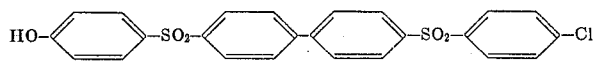

4-(4-Chlorophenylsulphonyl)-4'-(4-hydroxyphenylsulphonyl)biphenyl (5 g ) was suspended in methanol (100 cm³) and a methanolic solution of potassium hydroxide was added (10 cm³ of a 1.04 N solution). The mixture was agitated for 30 minutes and the solvents were slowly removed under reduced pressure to give the potassium salt of formula

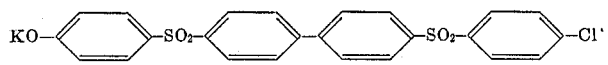

as a yellow solid.

This salt was dired under vacuum at a temperature of 125°C for 18 hours, and was then polymerized in the melt at 310°C for one hour. The polymer was worked up by dissolving the products from the polymerization in N,N-dimethylformamide and precipitating the polymer by pouring the solution into water. The polymer had a reduced viscosity of 0.7, measured on a solution containing 1 g of polymer in 100 cm³ of N,N-dimethylformamide at 25°C, and it had a glass transition point of 279°C, measured by differential scanning calorimetry. Its infra-red and nuclear magnetic resonance spectra were consistent with the polymer consisting essentially of repeating units having the structure

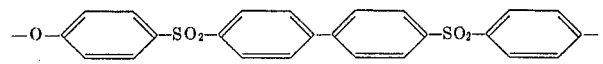

EXAMPLE 2

A mixture of biphenyl (462 g; 3 mole) and 4-fluorobenzenesulphonyl chloride (616.5 g; 3 mole) was dissolved in nitrobenzene (600 cm³) and the solution was stirred under an atmosphere of nitrogen and heated to 110°C. Anhydrous ferric chloride (6 g) was added and the stirring was continued and the mixture kept at 110°C until the evolution of hydrogen chloride subsided.

The dark-colored solution was then poured into methanol (1.5 liter) and the precipitate filtered off. This was then washed with more methanol (1.5 liter), followed by washing with a mixture of methanol (500 cm³) and acetyl acetone (10 cm³), and after a final wash with methanol was air-dried. Recrystallization from dimethyl sulphoxide afforded 4-(4-fluorophenylsulphonyl)-biphenyl in 62 percent yield as pale yellow needles, m.p. 165°–166°C. The infra-red and n.m.r. spectra were consistent with the structure

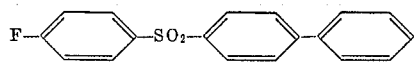

EXAMPLE 3

A mixture of 4-(4-chlorophenylsulphonyl)-biphenyl (109 g; 0.33 mole) prepared as described in Example 1 and dried potassium fluoride (40 g; 0.70 mole) was stirred and heated to 350°C under a slow stream of nitrogen. After heating for 48 hours at this temperature, the material was poured out of the reaction vessel, allowed to solidify and ground to a fine powder. This powder was continuously extracted with chloroform to give a dark red-colored solution which on evaporation afforded a grey solid. Recrystallization from acetic acid gave 4-(4-fluorophenylsulphonyl)biphenyl in 30 percent yield, m.p. 163°–164.5°C which was underpressed on admixture with the product of Example 2. The spectral characteristics of the material were identical with those of the product of Example 2.

4-(4-Fluorophenylsulphonyl)biphenyl and 4-chlorobenzenesulphonyl chloride were reacted together in the same manner as described in Example 1 for their respective chloro- and fluoro- analogues to give the same 4-(4-chlorophenylsulphonyl)-4'-(4-fluorophenylsulphonyl)-biphenyl as a starting material for conversion into polymer as therein described.

We claim:

1. An aromatic sulphone of the formula

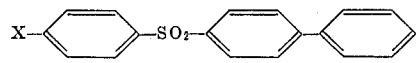

in which X is a fluorine or chlorine atom.

* * * * *